May 11, 1965 S. F. REED ETAL 3,182,796
APPARATUS FOR SEPARATING AND FEEDING SHEET-LIKE ARTICLES
Filed May 17, 1962 2 Sheets-Sheet 1
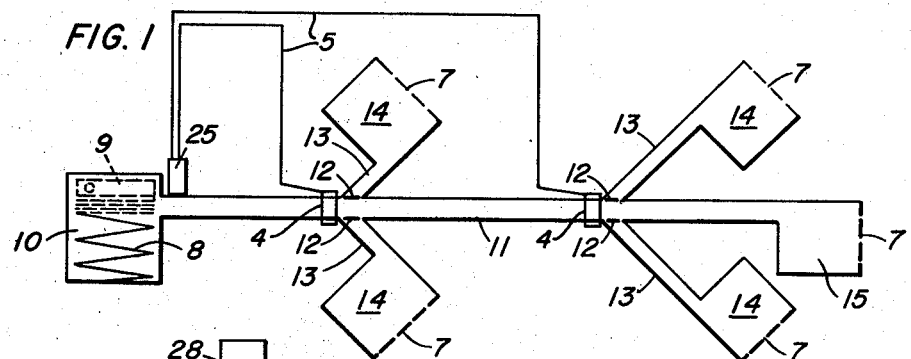
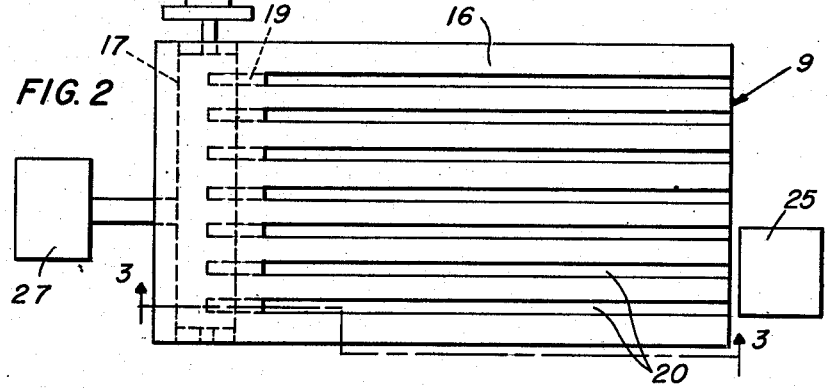
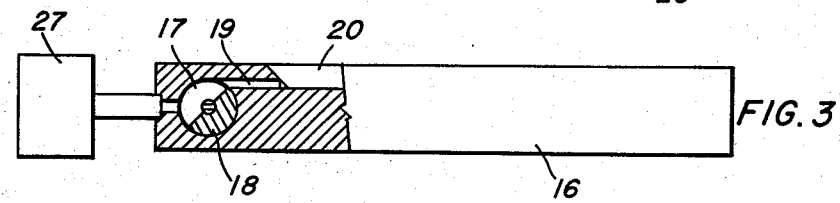
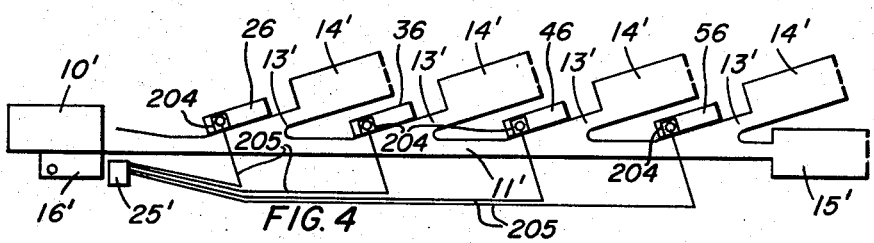
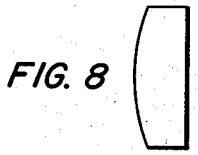
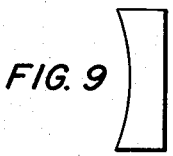
INVENTORS
STANLEY F. REED
GEORGE W. COOK
BY
ATTORNEY May 11, 1965  S. F. REED ETAL  3,182,796
APPARATUS FOR SEPARATING AND FEEDING SHEET-LIKE ARTICLES
Filed May 17, 1962  2 Sheets-Sheet 2
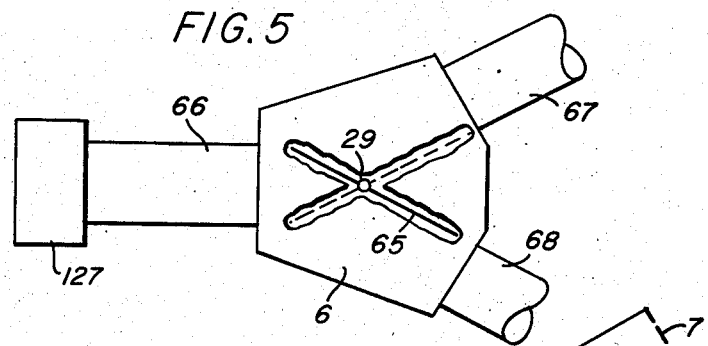
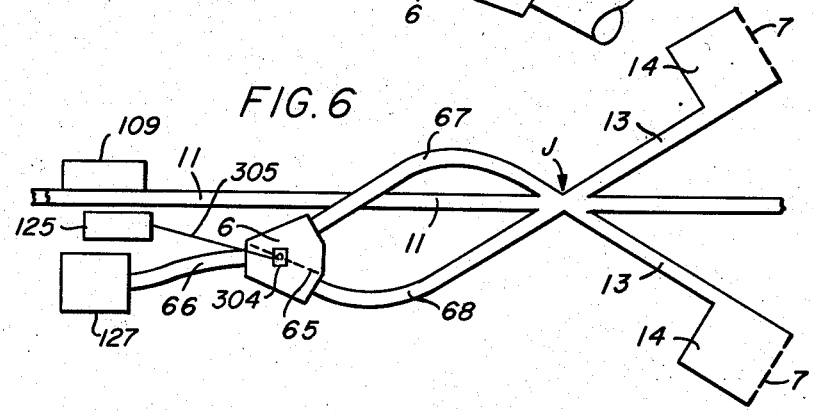
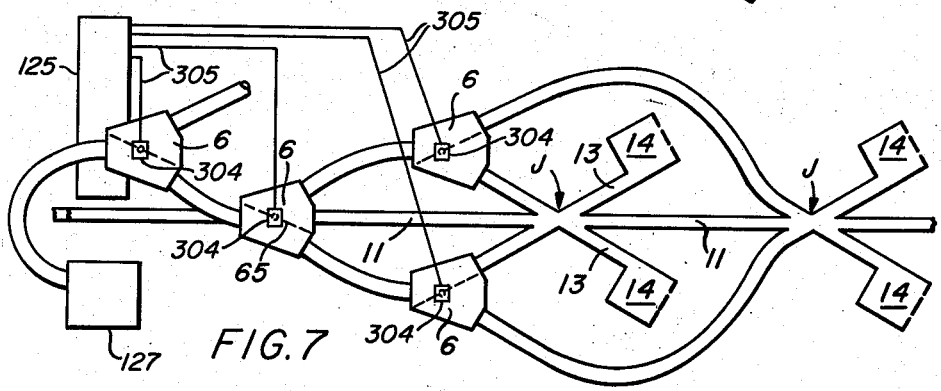
INVENTORS
STANLEY F. REED
GEORGE W. COOK
BY
ATTORNEY United States Patent Office 3,182,796
Patented May 11, 1965

3,182,796
APPARATUS FOR SEPARATING AND FEEDING
SHEET-LIKE ARTICLES
Stanley F. Reed, McLean, Va., and George W. Cook, Yardley, Pa., assignors, by mesne assignments, to Pitney-Bowes, Inc., Stamford, Conn., a corporation of Delaware
Filed May 17, 1962, Ser. No. 195,439
7 Claims. (Cl. 209—73)

This is a continuation-in-part of Serial No. 703,417, filed December 17, 1957, which is now abandoned.

This invention relates to an article handling system which is capable of aerodynamically separating and feeding each of a plurality of stacked sheet-like articles.

In many present day business machines some sort of apparatus is provided for serially supplying a plurality of sheet-like articles to a work station. In most cases the sheet-like articles, such as cheques or other documents, are initially disposed in a stack and must be individually separated from the stack and transported to said work station. Various devices and techniques have been proposed and used for producing the separating and feeding operations however the complexity and/or the expense of the equipment usually involved here becomes excessive particularly when higher speeds and/or more reliable operations are sought.

The primary object of the instant invention is to provide an improved article separating and feeding device wherein aerodynamic forces are applied and controlled so as to produce the desired manipulation of the successive sheet-like articles to be handled.

Another object of the invention is to provide a novel article handling apparatus wherein a fluid flow is established in one longitudinal direction along a guide surface and this fluid flow is applied and controlled so as to aerodynamically separate and longitudinally accelerate each of a series of sheet-like articles.

Several other objects will become apparent as the disclosure progresses.

The instant invention will be described in connection with a cheque sorting device however it will be understood that the present apparatus may be utilized in various other applications.

In the drawings:

FIGURE 1 represents a top plan view of an apparatus for sorting documents into several categories, the branches leading to corresponding receptacles being controlled by gates.

FIGURE 2 is a fragmentary front elevational view of the pneumatic device of FIGURE 1.

FIGURE 3 is a part sectional bottom plan view, taken along line 3—3 of FIGURE 2.

FIGURE 4 illustrates a modification of the apparatus shown in FIGURE 1.

FIGURES 5, 6 and 7 show an alternative arrangement for diverting documents, which have been accelerated by any means, to a selected branch or receptacle.

FIGURES 8 and 9 are reduced fragmentary left side elevational views showing alternative operative surface configurations for the block portion of the device of FIGURES 1, 2, and 3.

The apparatus shown in FIGURE 1 is envisaged as comprising a container 10 for the sheet-like articles, such as cheques, to be sorted; which cheques may for example, be stacked along one side of the container, each cheque being arranged on its longest edge as is conventional in the normal processing of cheques, each cheque in turn being attracted to a pneumatic separator or accelerator denoted generally by the numeral 9 for feeding the cheques singly along a transport track or conduit 11. The pneumatic separator 9 is preferably associated with a magnetic sensing head or other reader 25 past which the cheques are fed in turn, this reader sensing the command information carried by the cheques with respect to the categories into which they are to be sorted. A spring 8 or other suitable means may be employed to move the stack toward the separator 9 as the stack becomes exhausted. Along the sides of the transport track 11 there are arranged a number of gates 12 controlling branches 13 which lead to a number of receptacles 14 corresponding to the respective categories into which it is desired to sort the cheques, the gates being actuated in response to the command information picked up off the cheques by the magnetic sensing head 25. The correlation of the sensing head 25 and gates 12, may, for example, be the same as elements 12 and 14 of U.S. Patent No. 2,804,974. A gate activating means 4 may be directly connected to each gate 12 and connectors 5 utilized to connect each gate activating means 4 to reader 25, all as is well known in the prior art. The track 11 terminates in a receptacle 15 for any cheques which have not been diverted by the gates 12. Receptacles 14 and 15 may be provided with foramina 7 communicating with the ambient atmosphere.

The pneumatic separator 9 used for accelerating the cheques is shown in detail in FIGS. 2 and 3 and consists of an accelerator block 16 having a cylindrical chamber or manifold 17 extending transversely along one end, this chamber being connected to a source of compressed air 27 and fitted with a rotatable valve 18 formed of a longitudinally divided cylinder whose speed of rotation is controlled by valve controller 28, air being admitted through small ducts or passageways 19 into a number of parallel grooves 20 along one surface of the block. The portions of the block between these grooves form a plurality of fingers substantially parallel to the direction of desired acceleration. When compressed air is supplied to the chamber 17 and the rotatable valve 18 is in position to provide communication to the ducts 19, the air escapes into the grooves 20 at extremely high velocity, thereby producing a suction effect adjacent to said surface of the block and normal thereto which will attract a cheque from the operative end of the stack in the container. It will be understood that due to the high velocity of the air in the grooves 20, the pressure on the face of the cheque in proximity to the block 16, i.e., its operative face, is very much lower than the ambient atmospheric pressure on the other side of the cheque; consequently, every portion of the cheque will be strongly attracted to and held flat and parallel to said surface of the block by this atmospheric pressure differential, while actually resting against a thin film of air escaping between said surface and the cheque. The friction produced by the high-velocity air-stream along the surface of conventional articles will furnish a large force on these articles in the direction of travel of said stream. Since the cheque is free to move over the thin film of escaping air, it will be impelled at high speed in the direction of the air flow, considerable momentum being imparted to it. The expanding air that escapes from the end of the grooves 20 in the block will travel with the cheque into the transport track 11. If a gate 12 has been actuated by a signal from the reader at the moment the cheque reaches it, the cheque will enter the corresponding branch 13 and receptacle 14 served by this gate. On the other hand, if none of the gates 12 have been actuated, the cheque will travel the full length of the transport track 11 and will be deposited as a reject in the end receptacle 15.

The air passing into the grooves 20 of block 16 of separator 9 may flow continuously or may be pulsed in successive jets in a conventional manner, such as disclosed in U.S. Patent No. 2,696,297; for example, if it is desired to have only one cheque at a time on the transport track, the rotatable valve 18 may be reclosed until the first cheque has reached one of the receptacles 14 or 15 and the apparatus is ready for another cheque to be fed along the transport track. Suitable conventional electronic or other feed-back devices may be employed to prevent the opening of the valve 18 until this has been accomplished. U.S. Patent No. 2,696,297 discloses a suitable circuit for providing this function. In any case, the actuation of the selected gate 12 is controlled by conventional electronic or pneumatic means when the cheque passes the reader 25 and the command information obtained.

A variation of the apparatus is shown in FIGURE 4 wherein corresponding elements are denoted by primes. After the initial separation and feeding of the cheque by the pneumatic separator 9 shown in FIGS. 2 and 3, another pneumatic separator 26, structurally identical to pneumatic separator 9, can be used as here shown to divert the cheque from the transport track to the first branch 13', no pivoted gate being needed for setting up the path to the appropriate receptacle 14'; other separators 36, 46, and 56, similar to 26, are provided at the successive junctions of branches 13' with track 11', the supply of air thereto being controlled by valves connected by conventional electronic circuitry to reader 25' according to the reading by reader 25' of the command carried by the cheque itself. A separator activating means 204 may be directly connected to each separator 26, 36, 46, and 56, and connectors 205 utilized to connect each separator activating means 204 to reader 25'.

In some instances, the cheques in the stack will either be somewhat rumpled, crinkled or the like or will be quite thin and flexible and their rigidity will be correspondingly low. To increase the rigidity of a cheque, the surface of block 16 which carries grooves 20 may be curved to have a geometric configuration having a longitudinal axis parallel to grooves 20. The curvature may be either convex as shown in FIGURE 8 or concave as shown in FIGURE 9. In this manner, a cheque drawn toward the surface of separator 9 will become bowed along a transverse cross-section and will be correspondingly more rigid, thus exhibiting a uniform surface to the frictional force of the high velocity air stream which impels the cheque along track 11.

It will be understood that the apparatus above described, with reference to both embodiments, may be employed without the use of the command information carried by the cheques themselves. For example, it may be desired to separate the articles in the container 10 without reference to command information carried thereby as by sorting every fifth article in one container 14, every seventeenth article in another container 14, and so on. In this mode of operation, the gates 12 of FIGURE 1 and the separators 26, 36, 46 and 56 of FIGURE 4 may be programmed by any conventional means to effect the above separation of the articles.

The cheque or other document accelerated by separator 9 passes along track 11 much more rapidly, at some point therealong, than the velocity of the ambient air through which the document is passing. As will be apparent from a consideration of the operation of the apparatus, there will be an almost continuous flow of air, from left to right of FIGURE 1, from the ends of grooves 20 into track 11. This will be true even with the pulsed exit of high pressure air from the separator 9 since the volume in track 11 and branches 13 is relatively large. This air escapes through the foramina 7.

FIGURES 5 through 7 of the drawings illustrate an arrangement for diverting cheques from a main track or conduit 11 into any one of the plurality of receptacles 14 communicating therewith through branches 13. Referring now to FIGURE 5 of the drawings, the numeral 66 denotes a duct carrying compressed air flowing in a direction from left to right from a source thereof 127. The numerals 67 and 68 denote branch ducts secured to duct 66 in any suitable manner as by casement block 6. The numeral 29 denotes an axle which carries a vane 65 which, when in the first position shown diagrammatically as solid diverts the stream of compressed air from duct 66 to branch duct 68. In its second position shown diagrammatically as dotted, vane 65 diverts the flow of compressed air from duct 66 to branch duct 67. The axle 29 is so positioned with respect to the surface of the vane that the dynamic pressure developed in deflecting the air stream from duct 66 will be sufficient to hold the vane in either of its two positions. A suitable rotary actuator 304 (shown diagrammatically in FIGURES 6 and 7), coupled to axle 29, changes the vane from one of its positions to the other.

Referring now to FIGURE 6 of the drawings, the arrangement illustrated at FIGURE 5 is shown as applied to a track or conduit 11 communicating with receptacles 14 through branches 13. Ducts 66, 67, and 68 are positioned above track or conduit 11. The track 11 and its associated branches and receptacles 13 and 14 may be identical in construction to that set forth in FIGURE 1 of the drawings. Accelerator 109 similar to accelerator 9, source of compressed air 127 similar to source of compressed air 27, reader 125 similar to reader 25, vane actuators 304 similar to gate activating means 4, and connectors 305 similar to connectors 5 all perform analogous functions to elements 9, 27, 25, 4, and 5 respectively. The ends of branch ducts 67 and 68 curve downwardly from the upper level of block 6 to track 11 and, as illustrated, the portions thereof which communicate with track 11 are colinear with branches 13.

In the operation of the embodiment shown in FIGURE 6, a cheque or other document is accelerated from left to right along track 11 by any means, it not being necessary that the accelerating means be the same as separator and accelerator 9 of FIGURE 2 of the drawings. The cheques or other documents carry any suitable sorting characteristic and pass by a reader 125 similar to 25 of FIGURE 1 of the drawings. Upon sensing by the reader 125, the vane 65 will be actuated to either of its two positions, depending upon the sorting characteristic, by means of the vane actuator 304 connected to axle 29. In the shown position of vane 65, the cheque or other document passes from left to right along track 11 and the pressurized fluid from duct 66 being diverted by vane 65 to duct 68, acts against the cheque to divert it into the upper branch 13. In the event that the sorting characteristic has dictated the opposite position of vane 65, the compressed air from duct 66 would be diverted to duct 67 and the cheque would then be diverted to the lower branch 13 upon reaching junction J.

FIGURE 7 of the drawings illustrates an arrangement similar to FIGURE 6 wherein a plurality of vanes 65 are employed to control the diversion of a cheque or other document passing along track 11 from left to right to one side or the other of any one of a plurality of junctions J.

Because each vane 65 will remain in the position in which it was last placed by the actuator associated with each axle 29, it is not necessary to re-activate a particular vane 65 associated with a particular receptacle 14 in the event that two successive cheques or other documents carry the same sorting characteristic and are therefore to be sorted into the same receptacle 14, as is the case with the embodiments of FIGURES 1 and 4. As in the two previous embodiments, the receptacles 14 may each be provided with foramina (not referenced) to provide for the escape of air. An extension of track 11 communicating with the ambient atmosphere, improves the diversionary action of the air passing through either duct 67 or 68 (see FIGURE 6) into its associated branch 13.

It will be understood, in connection with any of the embodiments illustrated, that any fluid other than air may be employed since the pneumatic apparatus for diverting the cheques or other documents from the main track 11 will operate in the same manner.

Since many changes could be made in the embodiments of the invention as particularly described and shown herein without departing from the scope of the invention, it is intended that these embodiments be considered as exemplary and that the invention not be limited except as warranted by the following claims.

We claim:

1. In a system for serially separating and transporting a plurality of sheet-like articles:
   an article guide track having an elongated guide surface formed thereon that is operative to guide each of said articles along a predetermined path;
   stack supporting means disposed adjacent an initial portion of said guide surface for supporting a stack of said sheet-like articles;
   an accelerator block member mounted adjacent said stack supporting means and said initial portion of said guide track, said accelerator block member having an operative surface formed thereon which is coextensive with said guide surface formed on said article guide track and which is arranged and disposed with respect to said stack supporting means so as to be opposed and facing the exposed front side of the leading article of said stack, said stack supporting means and said accelerator block member being mutually arranged so that no component of the weight of said stack of articles bears against said operative surface of said accelerator block member;
   said operative surface of the accelerator block member having a plurality of apertures formed therein so as to permit streams of air to flow therethrough and longitudinally along said operative surface in the article feed direction;
   fluid conduit means for directing fluid flow through said apertures and in one longitudinal direction along said operative and guide surfaces and away from said stack supporting means, said directed fluid flow causing a pressure differential to exist across the opposite side faces of the leading sheet-like article so that said leading article is laterally attracted towards said operative surface and also causing the thus attracted leading article to be accelerated longitudinally along said operative and guide surfaces in said one longitudinal direction of fluid flow; and
   valve means for controlling the flow of fluid from a fluid source to said fluid conduit means.

2. Apparatus as defined by claim 1 wherein said stack supporting means is arranged to support said stacked articles on their lower edges, and wherein said track is arranged to permit said sheet-like articles to slide along on their respective lower edges with their respective front faces facing said guide surface.

3. Apparatus as defined by claim 1 wherein at least a portion of said operative surface has a concave configuration with respect to a longitudinal axis of said operative surface.

4. Apparatus as defined by claim 1 wherein at least a portion of said operative surface has a convex configuration with respect to a longitudinal axis of said operative surface.

5. Apparatus as defined in claim 1: additionally comprising a second fluid conduit means coupled to said track;
   and control valve means operatively disposed in said second conduit means, said control valve means including at least one bistable fluid valve which controls the supply of fluid to said article track and which is retained in at least one of its two operative positions by the aerodynamic forces of the fluid flowing through said valve.

6. Apparatus as defined by claim 1 wherein said apertures formed in said operative surface of said accelerator block member include a plurality of longitudinally extending grooves formed in said operative surface, the bottoms of said grooves communicating with said fluid conduit means.

7. In a system for serially separating, transporting and sorting a plurality of sheet-like articles that are recognizable by article reader means:
   an article track having an elongated guide surface formed thereon that is operative to guide sheet-like articles therealong;
   stack supporting means disposed adjacent an initial portion of said guide surface for supporting a stack of said sheet-like articles;
   an accelerator block member mounted adjacent said stack supporting means and said initial portion of said guide surface, said accelerator block member having an operative surface formed thereon which is coextensive with said track guide surface and which is opposed to and facing the exposed front side of the leading article of said stack;
   said stack supporting means and said accelerator block member being mutually arranged so that no component of the weight of said stack of articles rests on said operative surface of said accelerator block member and so that said articles are slidably supported on their lower edges with their respective front faces facing said operative surface of said accelerator block member;
   said operative surface of said accelerator block member having a plurality of longitudinally extending grooves formed therein;
   fluid conduit means for directing a fluid flow through said grooves and longitudinally along said operative surface and away from said stack supporting means, said directed fluid flow causing a pressure differential to exist across the opposite faces of the leading article in said stack so that said leading article is laterally attracted away from said stack and towards said operative surface of said accelerator block member and also causing said attracted leading article to be accelerated longitudinally along said operative surface and said guide surface in the longitudinal direction of fluid flow;
   valve means for controlling the flow of fluid from a fluid source to said fluid conduit means;
   a plurality of branch tracks connected to said article track, each of said branch tracks corresponding to a sorting characteristic;
   a gate positioned adjacent to each of said branch tracks;
   reader means positioned along said article track between said stack supporting means and the branch track closest to said stack supporting means, said reader means being operatively associated with said article track;
   each of said gates having a gate activating means connected thereto, each of said gate activating means being connected to said reader means;

said gates, said gate activating means, said branch tracks, said article track, and said reader means being so correlated that when an article carrying a sorting characteristic is separated and fed along said track past said reader means the latter will activate the gate activating means controlling the gate associated with the branch corresponding to the sorting characteristic carried by the article whereby this article will be diverted by the gate connected to the activated gate activating means into the branch corresponding to the sorting characteristic recognized by said reader means.

References Cited by the Examiner

UNITED STATES PATENTS

| | | |
|---|---|---|
| 1,595,478 | 8/26 | Minton. |
| 1,770,659 | 7/30 | Oehmichen. |
| 2,254,931 | 9/41 | Bryce. |
| 2,527,394 | 10/50 | Browne. |
| 2,791,329 | 5/57 | Schwartz _____ 209—88 |
| 2,848,820 | 8/58 | Wallin _____ 226—97 X |
| 2,900,146 | 8/59 | Hafner. |
| 2,934,378 | 4/60 | Gilbert. |

ROBERT B. REEVES, *Acting Primary Examiner.*

ABRAHAM BERLIN, *Examiner.*

UNITED STATES PATENT OFFICE
CERTIFICATE OF CORRECTION

Patent No. 3,182,796

May 11, 1965

Stanley F. Reed et al.

It is hereby certified that error appears in the above numbered patent requiring correction and that the said Letters Patent should read as corrected below.

In the heading to the printed specification, after line 7, insert the following:

> Claims priority, application Great Britain, Dec. 17, 1956, 820,036/56

Signed and sealed this 12th day of October 1965.

(SEAL)
Attest:

ERNEST W. SWIDER
Attesting Officer

EDWARD J. BRENNER
Commissioner of Patents